United States Patent
Jang et al.

(10) Patent No.: US 12,556,005 B2
(45) Date of Patent: Feb. 17, 2026

(54) ON-BOARD CHARGER FOR ELECTRIC VEHICLE, RELAY CONTROL METHOD THEREOF, AND BIDIRECTIONAL CHARGING SYSTEM FOR ELECTRIC VEHICLE COMPRISING SAME

(71) Applicants: Hyundai Motor Company, Seoul (KR); Kia Corporation, Seoul (KR)

(72) Inventors: Young Jin Jang, Seoul (KR); Dong Jun Lee, Suwon-si (KR); Sung Hwan Kim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 31 days.

(21) Appl. No.: 18/607,755

(22) Filed: Mar. 18, 2024

(65) Prior Publication Data
US 2025/0062620 A1 Feb. 20, 2025

(30) Foreign Application Priority Data
Aug. 14, 2023 (KR) .................. 10-2023-0106343

(51) Int. Cl.
| | |
|---|---|
| *B60L 53/20* | (2019.01) |
| *B60L 53/16* | (2019.01) |
| *B60L 53/66* | (2019.01) |
| *B60L 55/00* | (2019.01) |
| *H02H 7/22* | (2006.01) |
| *H02J 3/32* | (2006.01) |
| *H02J 7/00* | (2006.01) |

(52) U.S. Cl.
CPC .............. *H02J 3/322* (2020.01); *B60L 53/16* (2019.02); *B60L 53/20* (2019.02); *B60L 53/66* (2019.02); *H02H 7/22* (2013.01); *H02J 7/0031* (2013.01)

(58) Field of Classification Search
CPC .......... B60L 53/20; B60L 53/66; B60L 55/00; H02J 3/322; H02J 7/00036; H02J 7/0031
See application file for complete search history.

(56) References Cited

U.S. PATENT DOCUMENTS

| | | | | |
|---|---|---|---|---|
| 8,988,042 | B2* | 3/2015 | Kamaga | B60L 50/16 |
| | | | | 320/109 |
| 9,467,001 | B2* | 10/2016 | Kinomura | B60L 53/62 |
| 9,917,470 | B2* | 3/2018 | Iisaka | B60L 58/20 |
| 9,919,612 | B2* | 3/2018 | Mizuno | B60L 53/16 |
| 9,963,040 | B2* | 5/2018 | Gorai | B60L 53/126 |
| 10,549,644 | B2* | 2/2020 | Kojima | B60L 53/68 |
| 11,135,935 | B2* | 10/2021 | Ono | B60L 53/66 |
| 2009/0079389 | A1* | 3/2009 | Ohtomo | B60L 50/16 |
| | | | | 320/109 |
| 2013/0314034 | A1* | 11/2013 | Ang | H02J 7/1438 |
| | | | | 320/137 |

(Continued)

*Primary Examiner* — Levi Gannon
(74) *Attorney, Agent, or Firm* — SLATER MATSIL, LLP

(57) ABSTRACT

An on-board charger for an electric vehicle includes a vehicle port configured to be connected to an external charger comprising a first relay located on an internal first power supply path, a power converter, a second relay located on a second power supply path between the vehicle port and the power converter, and a controller configured to turn off the first relay and the second relay in response to triggering a vehicle-to-grid (V2G) protection operation based on power-related parameters.

17 Claims, 5 Drawing Sheets

(56) References Cited

U.S. PATENT DOCUMENTS

| | | | |
|---|---|---|---|
| 2014/0091764 A1* | 4/2014 | Kinomura | B60L 53/11 320/109 |
| 2014/0225437 A1* | 8/2014 | Mizuno | H02J 9/06 307/66 |
| 2014/0232182 A1* | 8/2014 | Kinomura | B60L 53/16 307/10.1 |
| 2022/0250498 A1* | 8/2022 | Okada | B60L 53/18 |

* cited by examiner

ON-BOARD CHARGER FOR ELECTRIC VEHICLE, RELAY CONTROL METHOD THEREOF, AND BIDIRECTIONAL CHARGING SYSTEM FOR ELECTRIC VEHICLE COMPRISING SAME

CROSS-REFERENCE TO RELATED APPLICATIONS

This application claims the benefit of Korean Patent Application No. 10-2023-0106343, filed on Aug. 14, 2023, which application is hereby incorporated herein by reference.

TECHNICAL FIELD

The present disclosure relates to an on-board charger for an electric vehicle.

BACKGROUND

Vehicle-to-Grid (V2G) refers to a function of supplying electricity to a grid power unit using the high-voltage battery of an electric vehicle. Utilizing V2G gives advantages in that consumers can gain additional benefits through electricity sales and in that electricity sellers can store electricity in the high-voltage battery of the vehicle (or vehicle battery) and use the same efficiently, thereby practically utilizing the vehicle as an electric power storage system (ESS).

V2G may be realized through communication between an on-board charger (OBC) (or two-way slow charger), a vehicle charging management system (VCMS), and an electric vehicle supply equipment (EVES).

The VCMS communicates with the EVSE to determine the V2G operation, and the OBC supplies power to the grid using the vehicle battery.

For safety reasons in relation to V2G, Ns protection (Network and System Protection) is legally enforced.

There are relays for galvanic cutoff between the vehicle battery and the grid so that one relay is located in the vehicle and one relay is located in the EVSE.

V2G requires fault diagnosis and relay off to be performed within a short time (maximum 90 ms), but it is difficult for the EVSE, which only serves as a simple charger, to perform fast fault diagnosis and relay off.

In addition, to prevent misdiagnosis, the relay (main relay) that plays the main role should be turned off first and the relay (auxiliary relay) that plays the auxiliary role should be turned off later. Therefore, an appropriate control method is required for two independent relays.

This background technical information that the inventor possessed for derivation of the present disclosure or acquired during the derivation of the present disclosure, and is not necessarily known art disclosed to the public prior to filing the present disclosure.

SUMMARY

The present disclosure relates to an OBC for an electric vehicle and in particular embodiments, to an OBC for an electric vehicle capable of quickly determining and controlling operations of a relay in the OBC and a relay in an external charger, a relay control method thereof, and a bidirectional charging system for an electric vehicle including the same.

An embodiment disclosed in the present disclosure can address the above-mentioned needs and can provide an OBC for an electric vehicle capable of quickly determining and controlling operations of a relay in the OBC and a relay in an external charger, a relay control method thereof, and a bidirectional charging system for an electric vehicle including the same.

The technical subjects of the present disclosure may not be limited to the above-mentioned technical subjects, and other technical subjects intended by the present disclosure may be clearly understood, through the following descriptions, by those skilled in the art to which the present disclosure pertains.

As a technical way to achieve the above-described technical task, there may be provided an OBC for an electric vehicle capable of quickly determining and controlling operations of a relay in the OBC and a relay in an external charger, a relay control method thereof, and a bidirectional charging system for an electric vehicle including the same.

An OBC for an electric vehicle according to an embodiment of the present disclosure may include a vehicle port connected to an external charger including a first relay located on an internal first power supply path, a second relay located on a second power supply path between the vehicle port and a power converter, and a controller configured to turn off the first relay and the second relay if a V2G (vehicle-to-grid) protection operation is determined to be required on the basis of power-related parameters.

According to an embodiment, the controller may directly turn off the second relay and output a relay-off signal for turning off the first relay to the external charger.

According to an embodiment, the relay-off signal may be a control pilot (CP) signal having a relay-off voltage level, and the controller may output the CP signal to the external charger through a CP line.

According to an embodiment, the controller, in the case where the first relay is configured as a main relay, may turn off the second relay after outputting the relay-off signal to the external charger.

According to an embodiment, the controller, in a case where the second relay is configured as a main relay, may output the relay-off signal to the external charger after turning off the second relay.

According to an embodiment, the OBC for an electric vehicle may include a CP signal output unit located between the CP line and ground, and configured to output the CP signal under the control of the controller.

According to an embodiment, the CP signal output unit may include two resistors located in parallel between the CP line and ground, and a switch located between one of the two resistors and ground, and the controller may control the switch to control a voltage level of the CP signal output from the CP signal output unit.

According to an embodiment, the controller may transmit relay-off information indicating that the V2G protection operation has been performed to the external charger before turning off the second relay.

According to an embodiment, the controller may compare a power-related parameter value obtained during operation with prestored V2G diagnosis parameter information and, if the obtained power-related parameter value falls outside of an allowable range included in the V2G diagnosis parameter information, determine that the V2G protection operation is required.

A relay control method of an OBC for an electric vehicle according to an embodiment of the present disclosure may include determining that a V2G (vehicle-to-grid) protection operation is required on the basis of power-related parameters obtained while performing operation and, if it is determined that the V2G protection operation is required, turning off a first relay located on a first power supply path in the external charger connected to the OBC and a second relay located on a second power supply path inside the OBC.

According to an embodiment, the turning off may include directly turning off the second relay and outputting a relay-off signal for turning off the first relay to the external charger.

According to an embodiment, the relay-off signal may be a CP signal having a relay-off voltage level, and the turning off may include outputting the CP signal to the external charger through a CP line.

According to an embodiment, the turning off may include, in a case where the first relay is configured as a main relay, turning off the second relay after outputting the relay-off signal to the external charger.

According to an embodiment, the turning off may include, in a case where the second relay is configured as a main relay, outputting the relay-off signal to the external charger after turning off the second relay.

According to an embodiment, the turning off may further include transmitting relay-off information indicating that the V2G protection operation has been performed to the external charger before turning off the second relay.

According to an embodiment, the determining may include comparing a power-related parameter value obtained during operation with prestored V2G diagnosis parameter information and, if the obtained power-related parameter value falls outside of an allowable range included in the V2G diagnosis parameter information, determining that the V2G protection operation is required.

According to an embodiment, the relay control method of an OBC may include receiving and storing V2G diagnosis parameter information from the external charger prior to the determining.

A bidirectional charging system for an electric vehicle according to an embodiment of the present disclosure may include an external charger including a first relay located on a first power supply path and an OBC including a second relay located on a second power supply path, and the OBC may turn off the first and second relays if a V2G (vehicle-to-grid) protection operation is determined to be required on the basis of power-related parameters obtained while performing operation.

According to an embodiment, the external charger may transmit V2G diagnosis parameter information to the OBC before the V2G operation, and the OBC may receive and store the V2G diagnosis parameter information transmitted from the external charger.

According to an embodiment of the present disclosure, it is possible to provide an OBC for an electric vehicle capable of quickly determining and controlling operations of a relay in the OBC and a relay in an external charger, a relay control method thereof, and a bidirectional charging system for an electric vehicle including the same.

According to an embodiment, because the OBC determines whether or not the relay in the external charger (EVSE) operates, as well as whether or not the relay in the OBC operates, it is possible to determine faster whether or not the relays operate than when the external charger determines whether or not the relay in the external charger operates.

According to an embodiment, because control of the relay in the external charger is performed through modulation of a CP signal without using a communication method such as Controller Area Network (CAN) or the like, quick control of the relay in the external charger is possible.

According to an embodiment, the OBC may preferentially perform an off operation of a main relay among the relay in the external charger and the relay in the OBC.

If the OBC preferentially turns off the relay in the external charger as described above, the OBC may notify the external charger that Ns protection has been performed, thereby preventing the external charger from misdiagnosing the relay.

Advantages of the present disclosure may not be limited to the above-mentioned advantages, and other advantages that are not mentioned may be clearly understood as well, through the following descriptions, by those skilled in the art to which the present disclosure pertains.

BRIEF DESCRIPTION OF THE DRAWINGS

The accompanying drawings along with detailed descriptions are provided to aid in understanding the embodiments of the present disclosure, in which.

DETAILED DESCRIPTION OF ILLUSTRATIVE EMBODIMENTS

Figure 1:
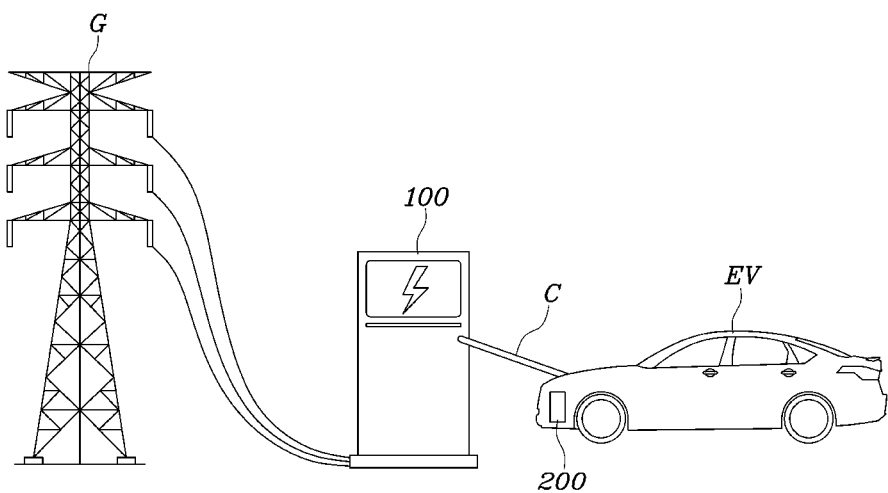
FIG. 1 is an overall conceptual diagram of a V2G infrastructure using a bidirectional charging system for an electric vehicle according to an embodiment of the present disclosure.

The advantages and features of the disclosure and ways to achieve them can be apparent by making reference to embodiments as described below in detail in conjunction with the accompanying drawings. However, the disclosure is not limited to the embodiments set forth below, and may be implemented in various different forms. The following embodiments are provided to inform those skilled in the art of the scope of the disclosure.

Shapes, sizes, ratios, angles, and numbers disclosed in the drawings for explanation of embodiments of the present disclosure are provided merely by way of example, and thus the present disclosure is not limited to those illustrated in the drawings. The same or like reference signs can designate the same or like elements throughout the specification. Furthermore, in describing the present disclosure, when it is determined that the detailed description of the known relevant arts unnecessarily obscures the subject matter of the present disclosure, the detailed description can be omitted. In the case where the expressions "comprise," "have," and "include" are used in the specification, another part may be added unless the term "only" is used. An element expressed in a singular form may include plural forms unless definitely indicated otherwise.

In construing an element, the element can be construed as covering an error range even though there is no explicit description of the error range.

In describing a temporal relationship, when a temporal order is described using, for example, "after," "subsequent to," "next to," or "before," the temporal order may include cases that are not continuous unless the term "just" or "immediately" is used.

The terms "first," "second," and the like may be used to describe various elements, but the elements are not necessarily limited by these terms. These terms can be used merely to distinguish one element from the others. Therefore, a first element as used in the following description may be a second element without departing from the spirit of the present disclosure.

In describing the elements of the present disclosure, such terms as "first," "second," "A," "B," "(a)," and "(b)" may be used. These terms can be used merely to discern the corresponding elements from the other elements, and the essence, sequence, order, or number of the corresponding elements are not necessarily limited by the terms. It can be understood that when an element is referred to as being "connected to" or "coupled to" another element, the element may be directly connected to or coupled to the other element, but yet another element may be interposed between the respective elements that may be connected or coupled indirectly to each other.

The term "at least one" should be understood as including any or all combinations of one or more of the associated elements enumerated. For example, "at least one of a first element, a second element, and a third element" may mean not only the first element, the second element, or the third element, but also all combinations of two or more of the first element, the second element, and the third element.

The respective features of various embodiments of the present disclosure may be partially or entirely coupled to or combined with each other and may be technically linked and inter-operated with each other in various manners, and the respective embodiments of the present disclosure may be carried out independently of each other or may be carried out in association with each other.

Hereinafter, embodiments of the present disclosure will be described in detail with reference to the accompanying drawings and the embodiments set forth herein. For the convenience of description, the scale of elements illustrated in the drawings may differ from the real scale, and thus the elements are not limited by the scale illustrated in the drawings.

Hereinafter, an OBC for an electric vehicle according to an embodiment of the present disclosure, a relay control method thereof, and a bidirectional charging system for an electric vehicle including the same will be described with reference to the accompanying drawings.

FIG. 1 is an overall conceptual diagram of a V2G infrastructure to which a bidirectional charging system for an electric vehicle according to an embodiment of the present disclosure is applied.

Referring to FIG. 1, the infrastructure to which the bidirectional charging system for an electric vehicle according to an embodiment of the present disclosure is applied includes a power system (grid) G, an external charger (e.g., electric vehicle supply equipment) (EVES) 100, and an on-board charger (OBC) 200 in an electric vehicle EV.

The power system G may be provided by a power supply company and may include, for example, a power plant, a substation, power cables, and the like. For example, the power system G may be a smart grid.

The power system G may supply power to a consumer or receive power from a consumer. For example, the power system G may supply power to the electric vehicle EV through the external charger 100 and receive power from the electric vehicle EV through the external charger 100.

The external charger 100 may provide power supplied from the power system G to the electric vehicle EV. In addition, the external charger 100 may provide power supplied from the electric vehicle EV to the power system G.

For example, the external charger 100 may supply power to the electric vehicle EV or receive power from the electric vehicle EV through a cable C.

The external charger 100 according to the embodiment provides external charger-related diagnosis parameter information (hereinafter, V2G diagnosis parameter information) to the on-board charger 200 of the electric vehicle EV. The external charger 100 may provide the V2G diagnosis parameter information to the on-board charger 200 before V2G operation.

The V2G diagnosis parameter information may include a standard range of parameters used by the on-board charger 200 to diagnose the state of the external charger 100.

For example, the V2G diagnosis parameter information may include an allowable voltage range, an allowable current range, and an allowable frequency range in which the external charger 100 operates normally.

According to an embodiment, the external charger 100 may provide V2G diagnosis parameter information to the on-board charger 200 using vehicle-related communication. For example, the external charger 100 may provide V2G diagnosis parameter information to the on-board charger 200 using communication schemes such as Controller Area Network (CAN), Local Interconnect Network (LIN), Power Line Communication (PLC), Pulse Width Modulation (PWM), and the like, for example.

The external charger 100 according to an embodiment may receive a relay-off signal from the on-board charger 200 and turn off an on-board relay (first relay or charger relay). According to an embodiment, the external charger 100 may receive a relay-off signal through a control pilot (CP) line included in the cable C.

In addition, upon receiving relay-off information from the on-board charger 200, the external charger 100 may display that relay off has been performed by the V2G protection function in response thereto. According to an embodiment, the external charger 100 may receive relay-off information from the on-board charger 200 using vehicle-related communication such as CAN, LIN, PLC, PWM, and the like, for example.

The on-board charger 200 may be mounted on the electric vehicle EV and may control charging and discharging of a high-voltage battery mounted to the electric vehicle EV (hereinafter referred to as a vehicle battery).

The on-board charger 200 may charge the vehicle battery using power supplied from the external charger 100 (charging mode). The on-board charger 200 may supply power of the vehicle battery to the external charger 100 (discharging mode).

According to an embodiment, the on-board charger 200 may receive V2G diagnosis parameter information from the external charger 100 and store the received V2G diagnosis parameter information.

The on-board charger 200 may obtain parameter values related to power supplied from the external charger 100 or parameter values related to power supplied to the external charger 100 while performing the V2G operation.

According to an embodiment, the on-board charger 200 may obtain values for voltage, current, and frequency in relation to power.

The on-board charger 200 may compare the obtained parameter values with the stored V2G diagnosis parameter information and determine whether or not to turn off the relay.

According to an embodiment, the on-board charger 200 may compare the obtained voltage value, current value, and frequency with the pre-stored allowable voltage range, allowable current range, and allowable frequency range to determine whether or not to turn off the relay.

If the obtained parameter value falls outside of a corresponding allowable range, the on-board charger 200 may perform a relay-off operation.

According to an embodiment, the on-board charger 200 may perform an operation of turning off a relay (second relay or vehicle relay) mounted therein. In addition, the on-board charger 200 may perform an operation of turning off a relay (first relay or charger relay) inside the external charger 100.

The on-board charger 200 may directly turn off the second relay and output a relay-off signal to the external charger 100 so as to turn off the first relay.

According to an embodiment, the on-board charger 200 may output a relay-off signal to the external charger 100 after turning off the second relay.

According to an embodiment, the on-board charger 200 may output a relay-off signal to the external charger 100 and then turn off the second relay. In this case, the on-board charger 200 may output relay-off information to the external charger 100 before turning off the second relay.

The on-board charger 200 may sequentially output a relay-off signal and relay-off information to the external charger 100 and then turn off the second relay.

Figure 2:
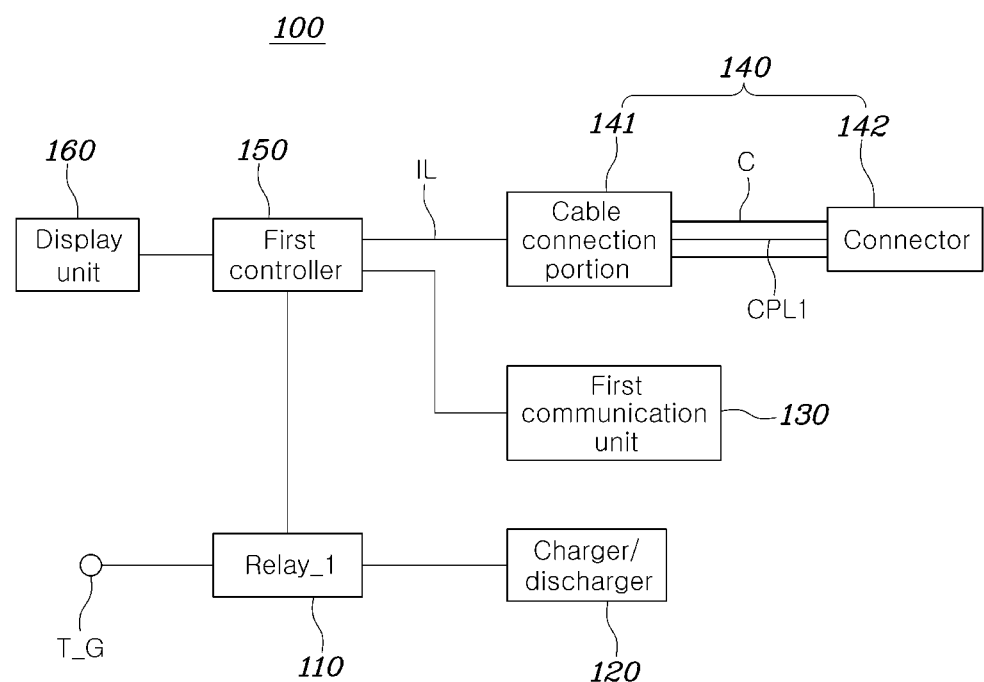
FIG. 2 is a diagram illustrating a detailed configuration of an external charger, such as an electric vehicle supply equipment (EVES), of a bidirectional charging system for an electric vehicle according to an embodiment of the present disclosure.
Figure 3:
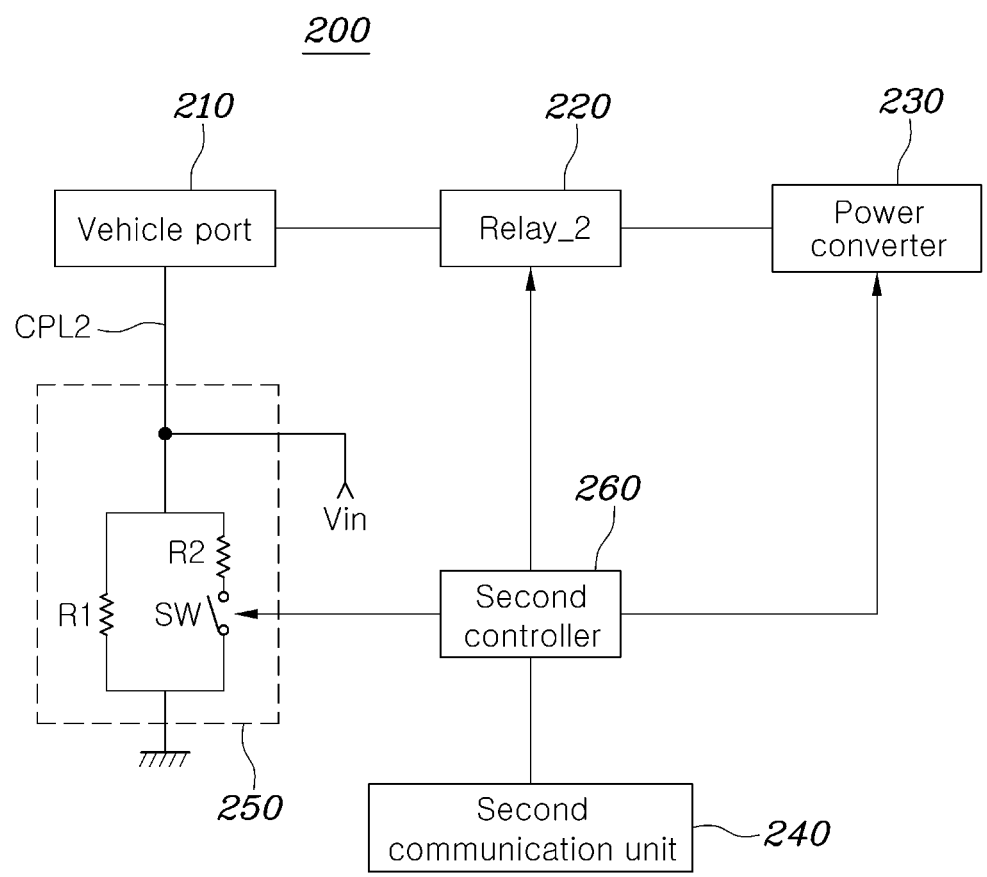
FIG. 3 is a diagram illustrating the configuration of an on-board charger (OBC) of a bidirectional charging system for an electric vehicle according to an embodiment of the present disclosure.

FIG. 2 is a diagram illustrating a detailed configuration of an external charger 100 (electric vehicle supply equipment) (EVES) of a bidirectional charging system for an electric vehicle according to an embodiment of the present disclosure. FIG. 3 is a diagram illustrating a configuration of an on-board charger (OBC) 200 of a bidirectional charging system for an electric vehicle according to an embodiment of the present disclosure.

Referring to FIGS. 1 to 3, the external charger 100 according to an embodiment may include a first relay (Relay_1 or R_1) 110, a charger/discharger 120, a first communication unit 130, a vehicle connection unit 140, a first controller 150, and a display unit 160, and the configuration of the external charger 100 is not necessarily limited thereto.

The first relay 110 may be located between a power system connection terminal T_G (connected to the power system G) and the charger/discharger 120, and may receive power supplied from the power system G through the power system connection terminal T_G and provide the same to the charger/discharger 120.

In addition, the first relay 110 may provide power supplied from the on-board charger 200 of the electric vehicle EV to the power system G through the power system connection terminal T_G.

A first power supply path may be defined between the power system connection terminal T_G and the charger/discharger 120.

According to an embodiment, the first relay 110 may operate under the control of the first controller 150 to be turned on or turned off. In a state in which the first relay 110 is turned on, the first relay 110 may provide power from the power system G to the charger/discharger 120 or provide power from the charger/discharger 120 to the power system G.

The charger/discharger 120 may convert power supplied through the first relay 110 into battery charging power and output the converted power. The charger/discharger 120 may convert power supplied from the electric vehicle EV into power system power and output the converted power.

For example, the charger/discharger 120 may output the battery charging power to the vehicle connection unit 140 and receive power supplied from the electric vehicle EV through the vehicle connection unit 140.

For example, the charger/discharger 120 may be connected to a cable connection portion 141 of the vehicle connection unit 140 to supply the battery charging power to the electric vehicle EV through the cable C or receive power supplied from the electric vehicle EV through both the cable C and the cable connection portion 141.

The first communication unit 130 can be configured for communication with the on-board charger 200 of the electric vehicle EV, and may transmit information transmitted from the first controller 150 to the on-board charger 200 and may receive information transmitted from the on-board charger 200 and forward the same to the first controller 150.

According to an embodiment, the first communication unit 130 may transmit V2G diagnosis parameter information to the on-board charger 200 and receive relay-off information from the on-board charger 200.

For example, the first communication unit 130 may communicate with the on-board charger 200 using vehicle-related communication schemes such as CAN, LIN, PLC, PWM, and the like, for example.

The vehicle connection unit 140 may be connected to a vehicle port of the electric vehicle EV to electrically connect the external charger 100 and the electric vehicle EV.

According to an embodiment, the vehicle connection unit 140 may include a cable connection portion 141, a cable C, and a connector 142.

One end of the cable connection portion 141 may be installed in the external charger 100, and the other end of the cable connection portion 141 may be connected to the cable C.

One end of the cable connection portion 141 may be electrically connected to the first controller 150 through an internal line IL and forward a CP signal input to the first controller 150 through a CP line CPL1 located inside the cable C.

The connector 142 may be connected to the other end of the cable connection portion 141 and may be connected to the vehicle port of the electric vehicle EV.

In the case where the connector 142 is connected to the vehicle port of the electric vehicle EV, the connector 142 may be electrically connected to the on-board charger 200 of the electric vehicle EV and may serve as a medium transmitting power or signals between the external charger 100 and the electric vehicle EV.

The first controller 150 may control the overall operation of the external charger 100 and enable the external charger 100 to provide power supplied from the power system G to the electric vehicle EV and provide power supplied from the electric vehicle EV to the power system G.

The first controller 150 may provide V2G diagnosis parameter information related to the external charger 100 to the electric vehicle EV. For example, the first controller 150 may provide V2G diagnosis parameter information to the electric vehicle EV before V2G operation.

For example, the first controller 150 may provide V2G diagnosis parameter information to the electric vehicle EV through the first communication unit 130.

The first controller 150 may perform control of the first relay 110 on the basis of a CP signal transmitted from the electric vehicle EV.

For example, the CP signal may be transmitted to the cable connection portion 141 through the CP line CPL1 in the cable C and then input to the first controller 150 through the internal line IL.

According to an embodiment, the first controller 150 may control the first relay 110 on the basis of the voltage level of the CP signal. For example, the first controller 150 may determine whether or not the voltage level of the CP signal falls within a preset relay-off voltage range and, if the voltage level of the CP signal falls within the relay-off voltage range, turn off the first relay 110.

As described above, because the first controller 150 controls the first relay 110 on the basis of the CP signal transmitted through the CP line CPL1, fast control of the first relay 110 is possible.

When receiving relay-off information provided from the electric vehicle EV, the first controller 150 may display, on the display unit 160, that relay-off has been performed by the V2G protection function in response thereto.

For example, the first controller 150 may receive relay-off information through the first communication unit 130.

An on-board charger 200 according to an embodiment may include a vehicle port 210, a second relay (Relay_2 or R_2) 220, a power converter 230, a second communication unit 240, and a CP signal output unit 250, and a second controller 260, and the configuration of the on-board charger 200 is not necessarily limited thereto.

The vehicle port 210 may be connected to the vehicle connection unit 140 of the external charger 100, receive power from the external charger 100, and provide power from the power converter 230 to the external charger 100 through the vehicle connection unit 140.

As the vehicle port 210 can be connected to the vehicle connection unit 140, the CP line (or first CP line) CPL1 of the vehicle connection unit 140 and the CP line (or second CP line) CPL2 of the OBC 200 may be connected to each other.

The second relay 220 may be located between the vehicle port 210 and the power converter 230, provide power supplied through the vehicle port 210 to the power converter 230, and provide power from the power converter 230 to the vehicle port 210.

A second power supply path may be defined between the vehicle port 210 and the power converter 230.

According to an embodiment, the second relay 220 may operate under the control of the second controller 260 to be turned on or turned off. In a state in which the second relay 220 is turned on, the second relay 220 may provide power from the vehicle port 210 to the power converter 230 or provide power from the power converter 230 to the vehicle port 210.

The power converter 230 may convert power supplied through the second relay 220 into power for a high-voltage battery of the electric vehicle EV and output the converted power. The power converter 230 may convert power supplied from the high-voltage battery of the electric vehicle EV into power system power and output the converted power.

The second communication unit 240 can be configured for communication with the external charger 100, and may transmit information transmitted from the second controller 260 to the first communication unit 130 of the external charger 100 and may receive information transmitted from the first communication unit 130 of the external charger 100 and forward the same to the second controller 260.

According to an embodiment, the second communication unit 240 may transmit relay-off information to the first communication unit 130 of the external charger 100 and receive V2G diagnosis parameter information from the first communication unit 130 of the external charger 100.

For example, the second communication unit 240 may communicate with the first communication unit 130 of the external charger 100 using vehicle-related communication schemes such as CAN, LIN, PLC, PWM, and the like.

The CP signal output unit 250 may output a CP signal to the CP line (or second CP line) CPL2 of the OBC 200.

The CP signal output from the CP signal output unit 250 may be transmitted along the second CP line CPL2 and the first CP line CPL1 of the vehicle connection unit 140 connected to the vehicle port 210 and then input to the first controller 150 of the external charger 100.

According to an embodiment, the CP signal output unit 250 may output a CP signal in response to control of the second controller 260.

The CP signal output unit 250 may output a CP signal having a first voltage level (or relay-off voltage level) or a CP signal having a second voltage level (or relay-on voltage level) in response to the control of the second controller 260.

According to an embodiment, the CP signal output unit 250 may include two resistors R1 and R2 located in parallel between the second CP line CPL2 and ground, and a switch SW can be connected in series to one of the two resistors R1 and R2. In an embodiment, the switch SW can be connected in series with the second resistor R2.

The switch SW of the CP signal output unit 250 can be turned on or off in response to the control of the second controller 260, and the output voltage of the CP signal output unit 250 varies depending on the state of the switch SW.

For example, the CP signal output unit 250 may output a CP signal having a first voltage level (or relay-off voltage level) if the switch SW is turned on and output a CP signal having a second voltage level (or relay-on voltage level) if the switch SW is turned off.

The second controller 260 may receive V2G diagnosis parameter information provided from the external charger 100 and store the received V2G diagnosis parameter information.

The second controller 260 may obtain values of parameters (e.g., voltage, current, frequency, etc.) related to the power provided from the external charger 100 or values of parameters (e.g., voltage, current, frequency, etc.) related to power supplied to the external charger 100 while performing the V2G operation.

For example, the second controller 260 may obtain parameter values related to power on the second power supply path between the vehicle port 210 and the power converter 230.

The second controller 260 may compare the obtained parameter values with stored V2G diagnosis parameter information and determine whether or not to turn off the relay.

According to an embodiment, the second controller 260 may compare the obtained voltage value, current value, and frequency with the pre-stored allowable voltage range, allowable current range, and allowable frequency range to determine whether or not to turn off the relay.

If any one of the obtained parameter values falls outside of a corresponding allowable range, the second controller 260 may perform a relay-off operation.

According to an embodiment, the second controller 260 may perform an operation of turning off the second relay. In addition, the second controller 260 may perform an operation of turning off the first relay inside the external charger 100.

Here, the second controller 260 may directly turn off the second relay 220 and control the CP signal output unit 250 to output a CP signal having a first voltage level (or relay-off voltage level) to the external charger 100 to turn off the first relay 110.

According to a setting, the second controller 260 may turn off the second relay 220 and then control the CP signal output unit 250 to output a CP signal having a first voltage level (or relay-off voltage level) to the external charger 100.

According to a setting, the second controller 260 may control the CP signal output unit 250 to output a CP signal having a first voltage level (or relay-off voltage level) to the external charger 100 and then turn off the second relay 220. In such case, the second controller 260 may output relay-off information to the external charger 100 through the second communication unit 240 before turning off the second relay 220.

Figure 4:
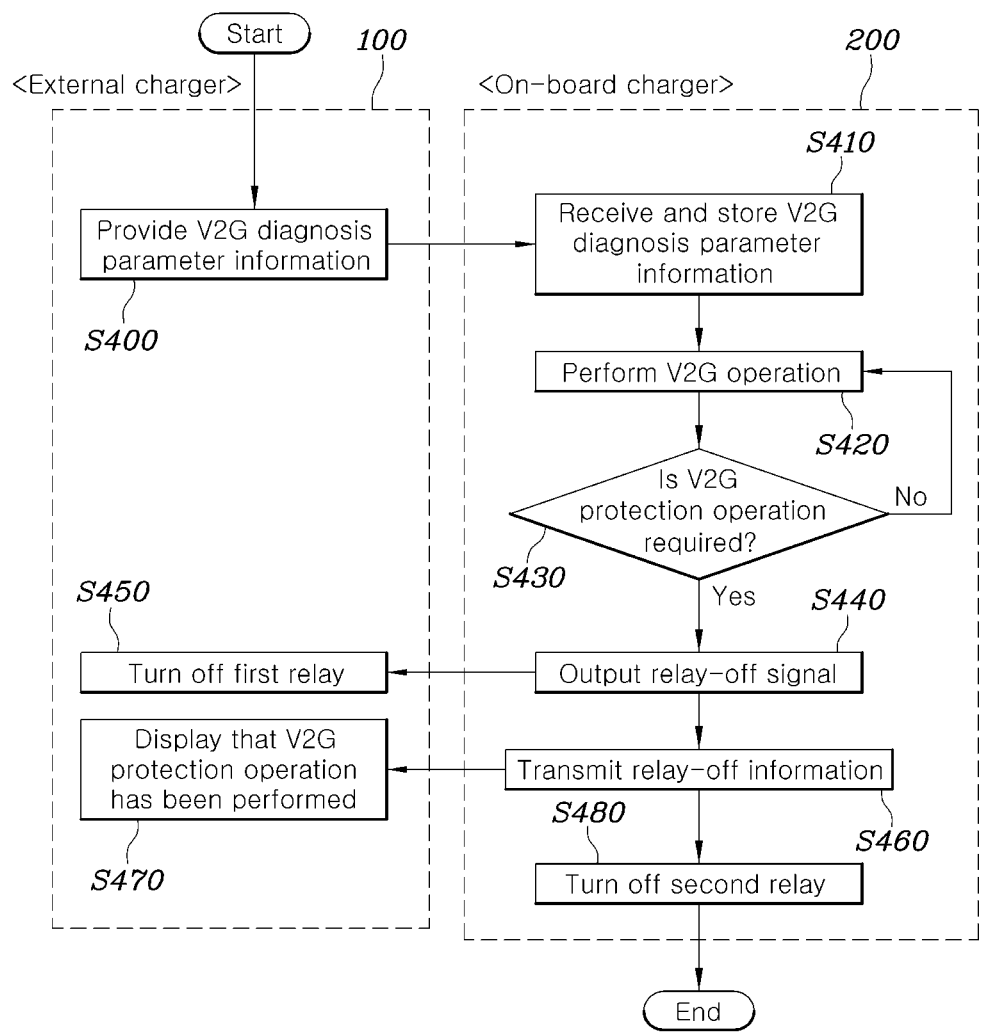
FIG. 4 is a diagram illustrating a relay control method of a bidirectional charging system for an electric vehicle according to an embodiment of the present disclosure.

FIG. 4 is a diagram illustrating a relay control method of a bidirectional charging system for an electric vehicle according to an embodiment of the present disclosure.

The relay control method of a bidirectional charging system for an electric vehicle shown in FIG. 4 is performed in the case where the entity of the V2G Ns protection operation is configured as the external charger 100 so that the first relay 110 in the external charger 100 serves as a main relay and so that the second relay 220 in the on-board charger 200 serves as an auxiliary relay.

Therefore, according to the relay control method of a bidirectional charging system for an electric vehicle shown in FIG. 4, the first relay 110 is preferentially turned off, and then the second relay 220 is turned off.

Referring to FIGS. 1 to 4, the external charger 100 may provide V2G diagnosis parameter information to the on-board charger 200 (operation S400), and the on-board charger 200 may receive the V2G diagnosis parameter information according thereto (operation S410).

The V2G diagnosis parameter information may include an allowable voltage range, an allowable current range, an allowable frequency range, and the like.

Thereafter, the on-board charger 200 may determine whether to perform an Ns protection operation (operation S430) while performing a V2G (vehicle-to-grid) operation (operation S420).

In operation S420, the on-board charger 200 may obtain values of power-related parameters (e.g., voltage, current, frequency, etc.) while performing the V2G operation.

In operation S430, the on-board charger 200 may compare the parameter values obtained in relation to the power with the V2G diagnosis parameter information and determine whether or not the obtained parameter values fall outside of allowable ranges.

If it is determined that the V2G protection operation is not required to be performed in operation S430 ("No" at operation S430), that is, if it is determined that the obtained parameter values fall within the allowable ranges, the on-board charger 200 may perform operation S420.

In operation S430, if at least one of the plurality of obtained parameter values (voltage, current, and frequency) falls outside of the allowable ranges, the on-board charger 200 may determine that the V2G protection operation is to be performed.

If it is determined that the V2G protection operation is to be performed in operation S430 ("Yes" at operation S430), the on-board charger 200 may output a signal ("relay-off signal") for turning off the first relay 110 in the external charger 100 to the external charger 100 (operation S440).

In operation S440, the relay-off signal may be a CP signal having a relay-off voltage level.

The external charger 100 may turn off the first relay 110 in response to the relay-off signal (operation S450).

Thereafter, the on-board charger 200 may transmit relay-off information indicating that relay-off has been performed by the V2G protection operation to the external charger 100 (operation S460).

Upon receiving the relay-off information, the external charger 100 may display that the V2G protection operation has been performed through the display unit 160 (operation S470).

Thereafter, the on-board charger 200 may turn off the second relay 220 (operation S480).

Figure 5:
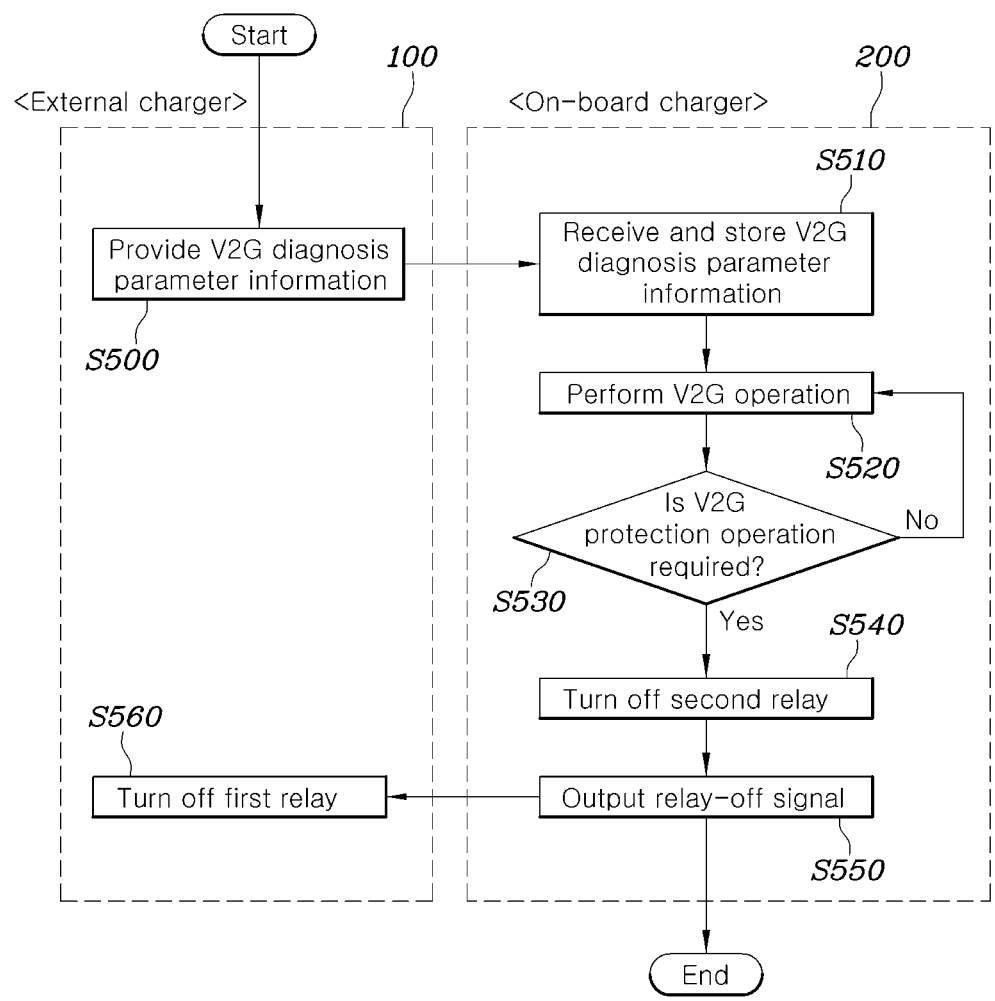
FIG. 5 is a diagram illustrating a relay control method of a bidirectional charging system for an electric vehicle according to an embodiment of the present disclosure.

FIG. 5 is a diagram illustrating a relay control method of a bidirectional charging system for an electric vehicle according to an embodiment of the present disclosure.

The relay control method of a bidirectional charging system for an electric vehicle shown in FIG. 5 can be performed in the case where the entity of the V2G Ns protection operation is configured as the on-board charger 200 so that the second relay 220 in the on-board charger 200 serves as a main relay and so that the first relay 110 in the external charger 100 serves as an auxiliary relay.

Therefore, according to the relay control method of a bidirectional charging system for an electric vehicle shown in FIG. 5, the second relay 220 is preferentially turned off, and then the first relay 110 is turned off.

Referring to FIGS. 1 to 3 and 5, the external charger 100 may provide V2G diagnosis parameter information to the on-board charger 200 (operation S500), and the on-board charger 200 may receive the V2G diagnosis parameter information according thereto (operation S510).

The V2G diagnosis parameter information may include an allowable voltage range, an allowable current range, an allowable frequency range, and the like.

Thereafter, the on-board charger 200 may determine whether to perform an Ns protection operation (operation S530) while performing a V2G (vehicle-to-grid) operation (operation S520).

In operation S520, the on-board charger 200 may obtain values of power-related parameters (e.g., voltage, current, frequency, etc.) while performing the V2G operation.

In operation S530, the on-board charger 200 may compare the parameter values obtained in relation to the power with the V2G diagnosis parameter information and determine whether or not the obtained parameter values fall outside of allowable ranges.

If it is determined that the V2G protection operation is not required to be performed in operation S530 ("No" at operation S530), that is, if it is determined that the obtained parameter values fall within the allowable ranges, the on-board charger 200 may perform operation S520.

In operation S530, if at least one of the plurality of obtained parameter values (voltage, current, and frequency) falls outside of the allowable ranges, the on-board charger 200 may determine that the V2G protection operation is to be performed.

If it is determined that the V2G protection operation is to be performed in operation S530 ("Yes" at operation S530), the on-board charger 200 may turn off the second relay 220 (operation S540).

Thereafter, the on-board charger 200 may output a signal ("relay-off signal") for turning off the first relay 110 in the external charger 100 to the external charger 100 (operation S550).

In operation S550, the relay-off signal may be a CP signal having a relay-off voltage level.

Thereafter, the external charger 100 may turn off the first relay 110 in response to the relay-off signal (operation S560).

Although embodiments of the present disclosure have been described above with reference to the accompanying drawings, the present disclosure is not necessarily limited to these embodiments and various modifications and changes may be made thereto without departing from the technical ideas of the present disclosure. Therefore, the embodiments disclosed herein are not necessarily intended to limit the technical ideas of the present disclosure but intended to explain the technical ideas of the present disclosure, and the scope of the technical ideas of the present disclosure is not necessarily limited by these embodiments. Accordingly, the embodiments as described above can be construed as be illustrative and non-limitative. The scope of protection of the present disclosure should be defined by the appended claims, and all technical ideas equivalent to the claims can be construed as falling within the scope of protection of the present disclosure.

What is claimed is:

1. An on-board charger for an electric vehicle, the on-board charger comprising:
   a vehicle port configured to be connected to an external charger comprising a first relay located on an internal first power supply path;
   a power converter;
   a second relay located on a second power supply path between the vehicle port and the power converter;
   a control pilot (CP) signal output unit configured to output to the external charger through a CP line a first CP signal having a relay-off voltage level or a second CP signal having a relay-on voltage level; and
   a controller configured to:
   turn off the first relay and the second relay in response to triggering a vehicle-to-grid (V2G) protection operation based on power-related parameters; and
   control a level of an output voltage of the CP signal output unit for turning off the first relay so that the CP signal output unit outputs the first CP signal to the external charger,
   wherein:
   the CP signal output unit comprises:
   two resistors configured in parallel between the CP line and a ground; and
   a switch configured in series between one of the two resistors and the ground, and
   the controller is further configured to control the switch to control a voltage level of the CP signal output from the CP signal output unit.

2. The on-board charger of claim 1, wherein the controller is further configured to:
   directly turn off the second relay and output the first CP signal to the external charger by the CP signal output unit.

3. The on-board charger of claim 2, wherein the controller is further configured to:
   turn off the second relay after outputting the first CP signal to the external charger by the CP signal output unit,
   wherein the first relay is configured as a main relay.

4. The on-board charger of claim 3, wherein the controller further is configured to transmit relay-off information indicating that the V2G protection operation has been performed to the external charger before turning off the second relay.

5. The on-board charger of claim 2, wherein the controller is further configured to:
   output the first CP signal to the external charger by the CP signal output unit after turning off the second relay,
   wherein the second relay is configured as a main relay.

6. The on-board charger of claim 1, wherein the CP signal output unit is located between the CP line and the ground.

7. The on-board charger of claim 1, wherein the controller is further configured to:
   compare a power-related parameter value obtained during operation with prestored V2G diagnosis parameter information; and
   trigger the V2G protection operation in response to the obtained power-related parameter value falling outside of an allowable range included in the V2G diagnosis parameter information.

8. A relay control method of an on-board charger (OBC) for an electric vehicle, the relay control method comprising:
   determining whether to trigger a vehicle-to-grid (V2G) protection operation based on power-related parameters obtained while performing an operation; and
   in response to determining to trigger the V2G protection operation, turning off a first relay and a second relay, wherein:
   the first relay is located on a first power supply path in an external charger connected to the OBC, and
   the second relay is located on a second power supply path inside the OBC, and
   wherein the OBC comprises:
   a control pilot (CP) signal output unit configured to output to the external charger through a CP line a first CP signal having a relay-off voltage level or a second CP signal having a relay-on voltage level; and
   a controller configured to turn off the first relay and the second relay,
   wherein the turning off comprises:
   controlling, by the controller, a level of an output voltage of the CP signal output unit for turning off the first relay; and
   outputting, by the CP signal output unit, the first CP signal to the external charger, and
   wherein the CP signal output unit comprises:
   two resistors configured in parallel between the CP line and a ground; and
   a switch configured in series between one of the two resistors and the ground,
   wherein controlling the level of the output voltage of the CP signal output unit comprises controlling the switch to control a voltage level of the CP signal output from the CP signal output unit.

9. The relay control method of claim 8, wherein the turning off further comprises directly turning off the second relay and outputting the first CP signal to the external charger by the CP signal output unit.

10. The relay control method of claim 9, wherein the turning off further comprises turning off the second relay after outputting the first CP signal to the external charger by the CP signal output unit when the first relay is configured as a main relay.

11. The relay control method of claim 10, wherein the turning off further comprises transmitting relay-off information indicating that the V2G protection operation has been performed to the external charger before turning off the second relay.

12. The relay control method of claim 9, wherein the turning off further comprises outputting the first CP signal to the external charger by the CP signal output unit after turning off the second relay when the second relay is configured as a main relay.

13. The relay control method of claim 8, wherein determining whether to trigger the V2G protection operation comprises:
  comparing a power-related parameter value obtained during operation with prestored V2G diagnosis parameter information; and
  determining to trigger the V2G protection operation when the obtained power-related parameter value falls outside of an allowable range included in the V2G diagnosis parameter information.

14. The relay control method of claim 8, further comprising receiving and storing V2G diagnosis parameter information from the external charger prior to determining whether to trigger the V2G protection operation.

15. A bidirectional charging system for an electric vehicle, the bidirectional charging system comprising:
  an external charger comprising a first relay located on a first power supply path in the external charger;
  an on-board charger (OBC) comprising a second relay located on a second power supply path in the OBC,
  wherein:
    the OBC is configured to turn off the first relay and the second relay in response to determining that a vehicle-to-grid (V2G) protection operation is required based on power-related parameters obtained while performing an operation, and
    the OBC further comprises:
      a control pilot (CP) signal output unit configured to output to the external charger through a CP line a first CP signal having a relay-off voltage level or a second CP signal having a relay-on voltage level; and
  a controller configured to:
    turn off the first relay and the second relay; and
    control a level of an output voltage of the CP signal output unit for turning off the first relay so that the CP signal output unit outputs the first CP signal to the external charger, and
  wherein:
    the CP signal output unit comprises:
      two resistors configured in parallel between the CP line and a ground; and
      a switch configured in series between one of the two resistors and the ground, and
    the controller is further configured to control the switch to control a voltage level of the CP signal output from the CP signal output unit.

16. The bidirectional charging system of claim 15, wherein the OBC is configured to directly turn off the second relay and output the first CP signal to the external charger by the CP signal output unit.

17. The bidirectional charging system of claim 15, wherein:
  the external charger is configured to transmit V2G diagnosis parameter information to the OBC, and
  the OBC is further configured to receive and store the V2G diagnosis parameter information transmitted from the external charger.

* * * * *